(12) United States Patent
O'Toole (10) Patent No.: US 10,567,253 B1
(45) Date of Patent: Feb. 18, 2020

(54) METHOD AND SYSTEM FOR COLLECTION, DATA-MINING AND DISPLAY OF INFORMATION REGARDING AND RELATING TO ATTENDEES OF LIVE EVENTS FOR MANAGEMENT DECISIONS

(71) Applicant: STAD.IO, LLC, Berkeley, CA (US)

(72) Inventor: Ryan O'Toole, Los Angeles, CA (US)

(73) Assignee: STAD.IO LLC, Berkeley, CA (US)

( * ) Notice: Subject to any disclaimer, the term of this patent is extended or adjusted under 35 U.S.C. 154(b) by 1050 days.

(21) Appl. No.: 14/822,639

(22) Filed: Aug. 10, 2015

Related U.S. Application Data

(63) Continuation-in-part of application No. 14/670,351, filed on Mar. 26, 2015, and a continuation-in-part of
(Continued)

(51) Int. Cl.
*G06Q 40/00* (2012.01)
*H04L 12/26* (2006.01)
(Continued)

(52) U.S. Cl.
CPC .......... *H04L 43/0811* (2013.01); *G06F 16/26* (2019.01); *H04L 67/10* (2013.01);
(Continued)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 4,592,546 A 6/1986 Fascenda et al.
6,920,428 B2 7/2005 Greene
(Continued)

OTHER PUBLICATIONS

Bunzel et al., The Best of Both Worlds: How to Effectively Leverage Social Media Relationships with Real-Time Collaboration Tools; Pbp media—Webinar, Apr. 14, 2010. (Year: 2010).*
(Continued)

*Primary Examiner* — Patricia H Munson
*Assistant Examiner* — Uche Byrd
(74) *Attorney, Agent, or Firm* — Jennifer Hayes; Nixon Peabody LLP (57) ABSTRACT

A system and method for enabling identification of and engagement with, high-value participants within the venue of a live-event from data collected and saved at events for providing improved customer service, marketing of products and increasing ticket sales to events are disclosed. An on-site wireless captive portal technology is used to authenticate attendees to live-events, and, upon authentication, collect their personal preferences and social profile details in real-time. The information collected at the live event is used to update a historic database at a main server station. The collected information is saved, combined with pre-saved historic data and data-mined to extract values for influence (i.e., number of followers who interact and follow an individual), social value (i.e., blogs and comments generated), and economic value (i.e., spending activity). The current and consolidate data is used to generate information and displays that show the impact of the influence and activities.

20 Claims, 7 Drawing Sheets

Related U.S. Application Data application No. 14/263,969, filed on Apr. 28, 2014, now Pat. No. 9,226,156.

(60) Provisional application No. 62/047,638, filed on Sep. 8, 2014, provisional application No. 61/974,883, filed on Apr. 3, 2014.

(51) Int. Cl.
*H04L 29/08* (2006.01)
*H04W 76/15* (2018.01)
*G06F 16/26* (2019.01)

(52) U.S. Cl.
CPC .............. *H04L 67/22* (2013.01); *H04L 67/24* (2013.01); *H04L 67/28* (2013.01); *H04L 67/306* (2013.01); *H04W 76/15* (2018.02)

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | |
|---|---|---|---|
| 7,603,321 | B2 | 10/2009 | Gurvey |
| 7,680,699 | B2 | 3/2010 | Porter et al. |
| 8,200,202 | B2 | 6/2012 | Gil et al. |
| 8,499,049 | B2 | 7/2013 | Lee et al. |
| 8,510,388 | B2 | 8/2013 | Taylor |
| 8,522,289 | B2 | 8/2013 | Athsani et al. |
| 9,432,923 | B2 | 8/2016 | O'Toole |
| 2003/0035386 | A1 | 2/2003 | Sullivan |
| 2004/0078825 | A1 | 4/2004 | Murphy |
| 2006/0031120 | A1 | 2/2006 | Roehr et al. |
| 2007/0143185 | A1 | 6/2007 | Harmon et al. |
| 2008/0109238 | A1 | 5/2008 | Harmon et al. |
| 2008/0109239 | A1 | 5/2008 | Harmon et al. |
| 2008/0114653 | A1 | 5/2008 | Harmon et al. |
| 2008/0244413 | A1 | 10/2008 | Sampson et al. |
| 2008/0255939 | A1 | 10/2008 | Harmon et al. |
| 2009/0106117 | A1 | 4/2009 | Porter et al. |
| 2009/0249484 | A1 | 10/2009 | Howard et al. |
| 2010/0080163 | A1* | 4/2010 | Krishnamoorthi .... H04L 12/189 370/312 |
| 2010/0129065 | A1 | 5/2010 | Porter et al. |
| 2011/0191158 | A1 | 8/2011 | Kateraas et al. |
| 2011/0231305 | A1 | 9/2011 | Winters |
| 2012/0066212 | A1* | 3/2012 | Jennings ........... G06F 17/30144 707/723 |
| 2012/0150631 | A1* | 6/2012 | Root .................. G06Q 30/0251 705/14.49 |
| 2012/0185544 | A1* | 7/2012 | Chang .................... G06Q 50/01 709/206 |
| 2012/0198497 | A1 | 8/2012 | Chan |
| 2013/0036369 | A1 | 2/2013 | Mitchell et al. |
| 2013/0046826 | A1* | 2/2013 | Stanton .................. G06Q 10/10 709/204 |
| 2013/0097635 | A1 | 4/2013 | Yerli |
| 2013/0159234 | A1 | 6/2013 | Xing et al. |
| 2013/0282421 | A1 | 10/2013 | Graff et al. |
| 2014/0035761 | A1 | 2/2014 | Burton et al. |
| 2014/0142733 | A1 | 5/2014 | Trooper et al. |
| 2014/0143038 | A1 | 5/2014 | Tropper et al. |
| 2014/0337090 | A1 | 11/2014 | Tavares |
| 2015/0120721 | A1* | 4/2015 | Kim ....................... H04L 67/10 707/728 |
| 2015/0312760 | A1 | 10/2015 | O'Toole |
| 2016/0358210 | A1 | 12/2016 | O'Toole |

OTHER PUBLICATIONS

Phizzle connect: http://www.phizzle.com/platform/phizzleconnect/; accessed Aug. 13, 2015.

InStadium: http://instadium.com/network/; accessed Aug. 13, 2015.

Notice of Allowance in U.S. Appl. No. 14/263,969 dated Aug. 25, 2015.

\* cited by examiner

Tabular list of user Data with search, sort and tag capability

| Loyalty | Name | Gender | Location | E-Mail |
|---|---|---|---|---|
| ♡ 0 | Ryan | male | Los Angeles, California | rahcok@xxx.com |
| ♡ 0 | Chris | male | Evergreen, Colorado | heublelec@xxx.com |
| ♡ 0 | Leslie | female | | rockinspired@xxx.com |
| ♡ 0 | Ed | male | Stockton, California | |
| ♡ 0 | Robert | male | Oakland, California | bob@xxx.com |
| ♡ 0 | Sean | female | | |
| ♡ 0 | Tarika | female | | tarika@xxx.com |
| ♡ 0 | Rachelle | female | | |
| ♡ 0 | Dante' D. | male | Los Angeles, California | |
| ♡ 0 | Keith | male | Stockton, California | keith@xxx.com |
| ♡ 0 | Rod | male | Stockton, California | |
| ♡ 0 | Melanie | female | Lathrop, California | hodgesfamily28@xxx.com |
| ♡ 0 | Michelle | female | | michelle.palomino@xxx.com |
| ♡ 0 | Barbara | female | Lodi, California | barb@xxx.com |
| ♡ 0 | Amy | female | | amy.meyer1984@xxx.com |
| ♡ 0 | Kris | male | | kriscook@xxx.com |
| ♡ 0 | Jay C. | male | | jc817@xxx.com |
| ♡ 0 | Mike | male | | jmk2735@xxx.com |
| ♡ 0 | Renee | female | | reneevaquera@xxx.com |
| ♡ 0 | Aaron | male | Stockton, California | aaronmcdowell11@xxx.com |
| ♡ 0 | Kevin | male | | khodges777@xxx.com |
| ♡ 0 | Maria | female | | mariaamaya83@xxx.com |
| ♡ 0 | Amanda | female | | alympichurkz@xxx.com |
| ♡ 0 | Monique | female | Stockton, California | mookie_pookie811@xxx.com |
| ♡ 0 | John | male | Stockton, California | jnburgess22@xxx.com |
| ♡ 0 | Isabel | female | | bella22lopez2@xxx.com |
| ♡ 0 | Jennifer | female | Stockton, California | jennifer.ajngs@xxx.com |
| ♡ 0 | Brian | male | Brentwood, California | brianmcauley@xxx.com |
| ♡ 0 | Laren C. | male | | dragonwell2@xxx.com |

Figure 9 (Table 1)

METHOD AND SYSTEM FOR COLLECTION, DATA-MINING AND DISPLAY OF INFORMATION REGARDING AND RELATING TO ATTENDEES OF LIVE EVENTS FOR MANAGEMENT DECISIONS

CROSS-REFERENCE TO RELATED APPLICATIONS

The present application claims priority to U.S. Provisional Application No. 62/047,638, entitled "Method and System for Collection, Data-mining and Display of Information Regarding and Relating to Attendees of Live Events for Management Decisions," filed Sep. 8, 2014, the entirety of which is hereby incorporated by reference.

The present application is a continuation-in-part of U.S. patent application Ser. No. 14/263,969, entitled "Authenticated Registration of Participants for Web Access at Live Events", filed Apr. 28, 2014.

The present application is a continuation-in-part of U.S. patent application Ser. No. 14/670,351, entitled "Filtering and Stratification for Identification of High Value Participants at Live Events in Real-Time", filed Mar. 26, 2015, which claims priority to U.S. Provisional Application No. 61/974,883, entitled "Filtering and Stratification for Identification of High Value Participants at Live Events in Real-Time", filed Apr. 3, 2014, the entireties of which are hereby incorporated by reference.

BACKGROUND

1. Field

The present disclosure relates generally to a method for enabling collection of data from participants of live-events for generation of a matrix enabling identification of high-value participants having high social influence, high social interaction value and high economic value at live-events.

2. Related Art

A problem faced by live-event (e.g., sporting events, concerts, etc.) administrators is the inability to identify participating attendees in real time. Now, event administrators are able to identify the purchaser of tickets but they have little or no ability to identify who actually attended the event. Most, if not all, live events are associated web sites/blogs on which individuals are allowed to input comments. Typically, most of these bloggers are people on the web who follow the event remotely (e.g., on the web), rather than those who actually attend the event. Hence, there is a real cross-over disconnect between social media event followers (social media group) and fans who actually attend the events live (real fan group).

Event administrators must improve ticket sales to fill stadiums and they also need to engage the attendees in real-time to participate by providing comments and reviews and make purchases in the venue. These activities cannot be done by approaching the social media group because they may not be in the venue.

Event administrators typically have more information about season ticket holders, who in most cases are repeat customers and may attend the events most of the time. However, there is a need to identify and approach multiple event attendees and spenders, at events, to entice them to attend other live events or to convert them to season ticket holders. There are no systems or methods that presently exist that allow this level of real-time data collection, enabling identification of attendees for such interaction.

An additional problem is the inability of the available data to provide meaningful information to the event management on the impact of changes and incentives, etc. implemented to improve return on investment. Today there are no systems and methods that allow this level of real-time data collection and enabling of interaction. There is also no capability to collect and save social and economic data from the live event sites and generate a matrix from the database to identify high value individuals who attend the events so as to provide them with the levels of enhanced customer service and interaction capabilities to maximize the return from their capabilities.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In accordance with one aspect of the invention, a system is disclosed, including a plurality of wireless access points distributed in a venue, wherein at least one mobile device is configured to wirelessly connect to one of the plurality of wireless access points during a live event in the venue; an access controller connected to the plurality of wireless access points; a proxy server connected to the access controller and a network so that a network access request from the at least one mobile device received during the live event is delivered to the proxy server through the access controller, wherein the proxy server authenticates the at least one mobile device and collects data relating to user profile information and user activities at the live event in the venue; and a main server connected to the proxy server, wherein the main server analyzes the collected data and generates consolidated information and individual-specific information and displays of the consolidated information and individual-specific information.

The system may further include a temporary database of the historic and current data of the user stored in a memory on the proxy server or in a memory communicatively connected to the proxy server. The temporary database may include user information corresponding to individuals associated with each of the mobile devices authenticated at the proxy server.

The historic database may be stored in memory of the main server or stored in the memory communicatively coupled with the main server. User information collected during the live event may be transferred to the historic database.

The displays may enable the identification of attendees that cross a threshold of social influence, social activity or economic activities as high-value attendees to be provided with special attention and customer service. The displays may enable presentation of information to event management to identify an effect of incentives and customer services changes made during the event.

In accordance with another aspect of the invention, a method is disclosed that includes connecting a mobile device to a proxy server at a live event venue; associating the mobile device with a hash tag at the local proxy server;

receiving a request at the proxy server from the mobile device to access a social media website; and inserting the hash tag into user activity associated with the mobile device, wherein the hash tag is auto-populated in responses to the user activity.

The method may further include collecting user profile information from the social network, user activity data from the venue, and responses to the user activity data using the hash tag and storing the information and data with the list of authenticated users in a temporary database and further transferring the collected and stored information to a historic data base with an event identifier.

The user activity data may include social network activity. The user activity data may include internet activity.

In accordance with yet another aspect of the invention, a method is provided that includes connecting a mobile device to a proxy server at a live event venue; generating a venue and attendee-specific identifier at a local proxy server; associating the generated venue and attendee-specific identifier with the mobile device at the local proxy server; and tracking social and economic activity of the attendee using the venue and attendee-specific identifier at the local proxy server.

The method may further include collecting user profile information from the social network and collecting activity data of the user at the live event and storing the collected information with the list of authenticated users in a temporary database and also transferring the user profile information and user activity data for storage in a historic database with an event identifier.

The method may further include collecting the personal preferences and social profile details of the individuals participating in a live-event in real-time.

The venue and attendee-specific identifier may be self-propagating to communication and social responses within social media. The venue and attendee-specific identifier may enable tracking of response activity within the social media to social activity by the attendee from within the live event venue. The venue and attendee-specific identifier may be a hash tag.

The response activity may be selected from the group consisting of posts, comments, blogs and messages. The social activity may be selected from the group consisting of posts, comments, blogs and messages.

Associating the generated venue and attendee-specific identifier with the mobile device may include downloading a script to the mobile device that contains the hash tag.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

A system and method enabling collection, storage, data-mining and display of data from live-event is disclosed. An on-site wireless technology is used to register and authenticate attendees, collect their personal-preferences and social-profile while enabling them to connect to social networks for posting and blogging from the live-event venue. The registered attendees are enabled to engage in economic activities at the live-event venue. The collected information and data are saved, combined with pre-saved historic data in a database, and data-mined to extract values for a) influence, based on the number of followers who interact and follow an individual, b) site social value, based on site activity level of blogs and comments generated, and c) economic value, based on the spending activity, for each attendee. The current and consolidated data are used to generate various information and displays showing the impact of the influence and activities to enable management decisions.

The systems and methods disclosed herein allow for collection and compilation of data regarding attendees and their activities at live-events while enabling customer interactions within and outside the live-event venue during the live-event. The data gathered is in the areas of attendees social preferences, their social influence as indicated by the number of connections and followers each attendee has, their social impact value as indicated by the attendees social activities such as blogging, commenting and such from the venue, and their economic activity value base on the spending pattern of the attendee while at the venue. This data can be saved in a historic database of attendees, which is updated from information gathered at current events attended by the attendees. The collected and stored data is data-mined and used to generate a matrix of the value of the attendees. This attendee value helps the live-event management to identify the high attendees, typically less than 20% of the total attendees, and provide them with improved customer service, and incentives to maximize their impact while at the venue. Additionally, the matrix of values generated provides a focus for ticket sales and commercial advertisements within the venues at live-events.

The system and method disclosed further allow improved access to customer's historical background, preferences and behavioral patterns while enabling collection of data on activities by the attendee at live-events to update such historic data. Data-mining on such a historic database provides the capability of identifying high value individuals, such as regular attendees at live-events, attendees who are high spenders within the arena, attendees with large following enabled to influence the actions of others and attendees who are bloggers enabled to provide comments and blogs regarding the live event from the venue as information and interest generation to others on the social network, etc. Connectivity and data collection are enabled by providing distributed wireless hot-spots covering the venue for access by the dedicated mobile devices of the attendees of a live-event which can be considered personal to each such attendee. Registration of mobile device users (attendee) attending the live-event using social media account result in authentication of the attendee by a local proxy-server. This registration and authentication process permit and enable a local proxy-server to gather the social profile and preference information on each of the attendees to the live event from the social media.

In one embodiment, the local proxy server that controls the connectivity from within the venue to the social networks and Internet is enabled to generate and insert an attendee and venue specific identification (identification component), such as, for example, a hash-tag. In such an implementation, each message going out of the arena is identified with an identifiable event specific hash tag. In an alternate embodiment, a java script or a small application program is downloaded into the attendee's personal handheld communication device, used for the activities in the live event venue that is enabled to insert a venue and attendee specific identification component to identify all communication, connection and economic activities while the attendee is in the venue. Alternately, such generated identification can be associated with or made part of the communication, social connection and other such activities of the attendee while in the live event venue.

Typically, the inserted venue specific identification is a self-propagating identification or hash-tag that enables tracking of the posts, comments, blogs, and messages from the live-event venue and also any responses to these on the social network and web. The information from social media, combined with the information regarding the activities such as purchases, blogging connections, comments and other interaction of the attendees using the capability provided to the registered and authenticated attendees to access the internet, via the wireless connections, are recorded and saved by the proxy-server, acting as the gateway to the Internet, in a temporary database during the live-event. Responses to the blogs, comments, such as likes and replies, and responses on the social media network are also collected by the proxy-server from the social networks using the added event specific hash-tag or other identifier as a search reference. In an alternate embodiment the social network is enabled to push the response information to the proxy-server or an attendee's historic-database on a monitoring main server for collection and storage. This collected data is used to update the attendee's historic-database on the monitoring main server.

In another embodiment, the application program (app) is downloaded from a main server system on to the attendee's personal hand held communication device via the proxy-server to register and authenticate from within the live event venue. The app enables the attendee's personal handheld communication device to connect to the services within the venue and also to connect to any white-listed social media, websites, to blog, comment, posts and such. In one example, win which Facebook is used as an example of the social network, the custom app creates the posts by calling the Facebook API with the user-submitted content and any other content that is enabled to be auto-populated. In response, Facebook returns a post object with a unique ID that can be used to track that post over time with subsequent API callbacks. Additionally, it enables the collection and monitoring of posts by user account or hash-tags or any other search parameter that the Facebook API supports.

One tracking advantage enabled by this approach is for a venue to accurately track social media content posted from or about their venue by the content generators. Attendee generated social content may or may not contain hash-tags or other key search terms that would allow a venue to discover that post in a search query to the Facebook API. In some embodiments of the invention, all posts created from the app are stored in the app's historical database. The posts are known to be relevant to the venue because they were created by the venue's location based app.

As an example, an attendee at a Giants baseball game posts to Facebook, "Having a great night at the game!". For the Giants to know about this positive posted endorsement would be challenging. A search query to the Facebook API query for "Giants" or "baseball" related posts, would not return this result, since the post's contents contain nothing specific to the Giants or baseball. Alternately, if the search is on a word that is in the post, like "game", then the search result set would contain many false-positive posts having nothing to do with the Giants. However, since the post originated from the Giants location specific app, it will be possible to know about that post, track it directly by its Facebook API ID, and identify it as relevant to the Giants.

In a another example, the response from a social media post created by the app is tracked by auto-populating an identification that is a user specific tracking code into the post's content, for example a ticket sale link with the user's unique ID embedded. The post appears on a user's timeline, and the timelines of that user's friends. When their friends click the link the ticket sale website can read the unique user ID from the URL, and log which user's post referred the traffic for that sale. The system tracks the ticket sale referral in the historical database, attributing each ticket sale back to the referring user or attendee, and thereby increasing their weighted customer value for social influence.

All the data including the response data collected is saved in the historic database. The data in the historic database is data mined and analyzed to generate a matrix that provides the event mangers information about who is attending versus who is buying tickets. By providing a weightage to the criteria of social influence, social activity and economic activity while in the venue of the live-event the matrix generated enable identification of high value individuals or attendees within the venue and provide a focus for improving return on advertisement expenditure while providing these high value attendees improved customer service with a much more enjoyable live-event experience. The matrix data hence allows user-faced advertisements to be developed and presented to the individual users, identify high value individuals attending the live-events, provide incentives to the frequent attendees, identify spenders at events, enables more focused ticket sale efforts and promotions to attendees, and thereby improve return on advertising expenditure.

The impact of the incentives and advertisements are also brought out and made available in a presentable form to the live-events through the generated matrix. The generated matrix also provides the management the ability to present the data to the top executives and others to ensure that the impact of any changes made to customer service are understood by all.

Multiple presentation formats and displays are used to generate the best understanding of the collected and compiled matrix of values of the customers from within and outside the live event venue as well as the historic data.

There are many examples of live-events at which the systems and methods described herein may be used. For instance, live-events having large attendance include NFL football games, usually in stadiums holding more than ten thousand spectators, college football games in similarly or larger stadiums, baseball games in the stadiums of National and American League teams, live concert venues, soccer games, NBA basketball games, and other spectator events that have many thousands of spectators. In another example, a venue at which the systems and methods described herein may be used include restaurants, coffee shops, bars, and the like, that have fewer patrons. For instance, customers may attend a concert at a bar or coffee shop that has a capacity of less than one hundred attendees. The venue may be any location at which there are people in attendance with smart phones or other mobile devices. It will be appreciated that the number of people in attendance at the venue may be any number including less than or greater than one hundred attendees or less than or greater than ten thousand spectators.

The systems and methods disclosed herein allow collection and compilation of data regarding attendees and their activities at live-events using the attendee's mobile device. The systems and methods enable customer interactions within and outside the live-event venue during the live-event. This data can be used to, for example, provide improved customer service, enable focused ticket sales, and enable generation and delivery of focused commercial advertisements within the venues during live-events.

In one embodiment, connectivity and data collection are enabled by providing distributed hot-spots, typically Wi-Fi, covering a venue with large attendance for access by the dedicated mobile devices of the attendees of a live-event. The mobile devices of attendees (MDAs) attending the live-event are registered and authenticated, enabling a local proxy server to gather the social profile information on the attendees to the live event from the social media. In one embodiment of the invention this information combined with the information regarding the activities such as purchases, blogging connections, comments and other interaction of the attendees are recorded and saved by the proxy server in a temporary database during the live-event. The user activity can be generated using the capability provided by the registered and authenticated MDAs. This data is used to update an attendee history database, on a main monitoring server, at the end of the live-event or even during the event.

This data can be analyzed to provide information to event managers relating to who is attending an event compared to who is buying tickets, and to provide focus for improving return on advertisement expenditure and to provide attendees improved customer service based on their past involvement for a much more valuable live-event experience. This data also allows the event managers to differentiate between individuals who just follow and comment on live-events and individuals who attend the live events enabling the event managers to focus their marketing efforts. The data collected allows attendee-faced advertisements to be developed and presented, identify high-value individuals attending the live-events, provide incentives to the frequent attendees, bloggers and commenters with high social-following, identify high spenders at events, and enable focused ticket sale efforts and promotions to attendees, to improve return for advertising expenditure.

The collected and stored data will be of use in providing improved customer service, and incentives to individuals, provide focus for ticket sales and commercial advertisements within the venues at live-events. The system and method allow improved access to customer's historic background, preferences and behavioral patterns of the past while enabling collection of data on activities by the attendee at live-events to update such historic data. Data-mining on such a historic database will provide capability to identify high value individuals, such as regular attendees, attendees at live-events, attendees who are high spenders within the arena, attendees with large following and who are bloggers enabled to influence others etc.

In this disclosure, the terms attendee and mobile device of attendee (MDA) may be used interchangeably to refer to a mobile device of an attendee. It will be further appreciated that each attendee can be identified by his or her personal mobile device.

Figure 1:
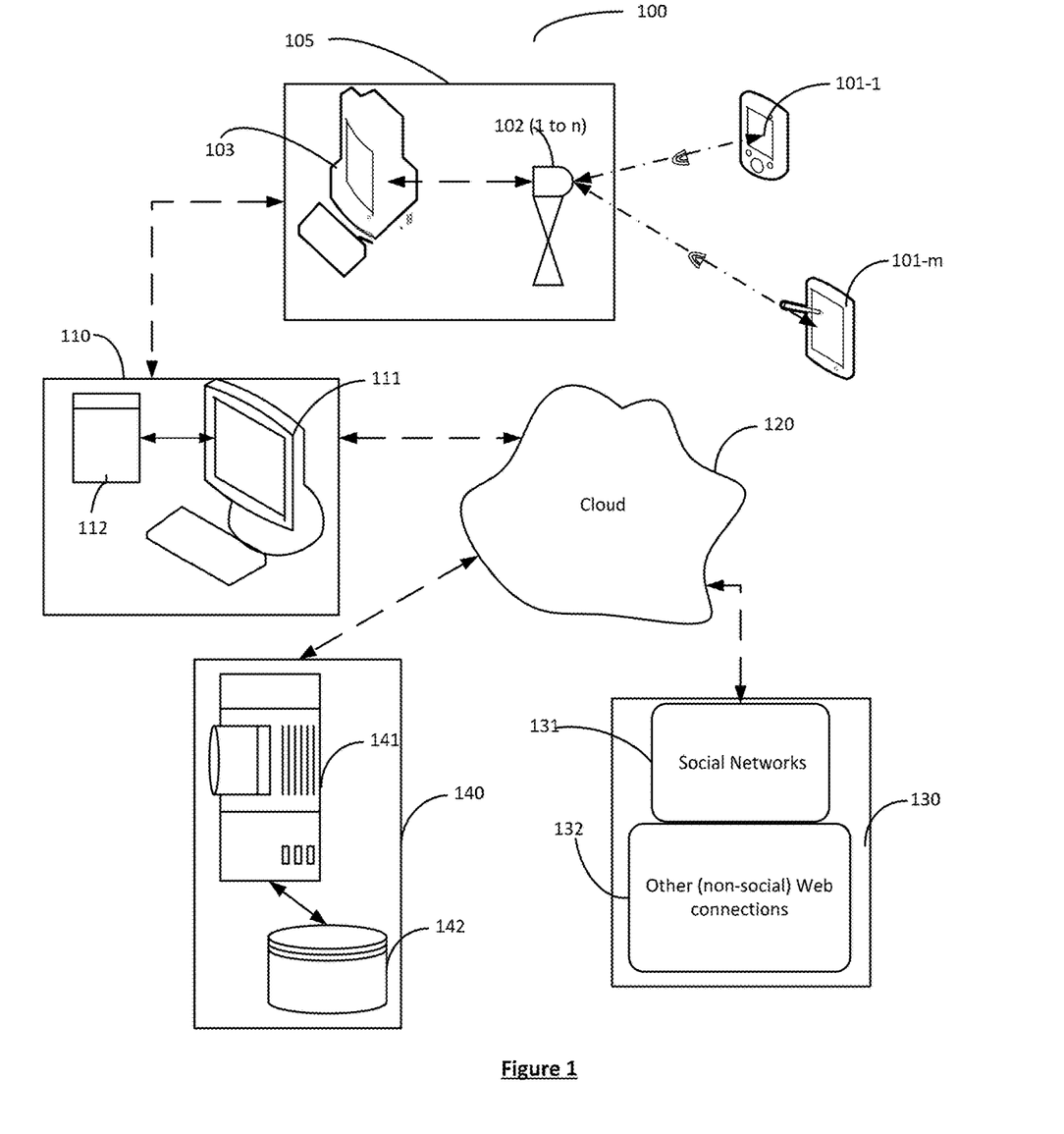
FIG. 1 is a block diagram of a registration and authentication system for live-event attendees according to one embodiment of the invention.

FIG. 1 is an exemplary block diagram of a system 100 for registration, authentication and web access of the attendees 101-1 to 101-*m* in the venue of a live-event in real-time. The system 100 also enables the collection of data on the attendees preferred activities, which can be saved for data mining and compilation to identify high value attendees.

This is done using the personal communication devices, such as cell phones, iPads, and other types of handheld communication devices (HCDs) or mobile devices of the attendees (MDAs) 101-1 to 101-*n* that are associated with each individual attendee and can be uniquely identified with the attendee user. The system 100 uses a wireless, typically Wi-Fi, portal technology.

As shown in FIG. 1, the system 100 includes a plurality of access points 102-1 to 102-*n*, an access controller 105 and a proxy server system (PSS) 110. The PSS 110 includes a proxy server 111 and memory including at least a temporary database 112. The temporary database may be stored in memory in the proxy server 111 or memory in the PSS 110 that is accessible by the proxy server 111. The system 100 also includes a main server system (MSS) 140 that includes a main server 141, having at least a processor and storage memory as well as a historic database 142. The main server 141 is also enabled as a data mining processor for data mining activities on the historic data stored in the historic database in the memory of the MSS 140. The historic database 142 is stored in memory in the main server 141 or a dedicated memory in the MSS 140 that is accessible by the main server 141. In FIG. 1, the web 150, including a social network 130 and a web authoring service 131, is shown coupled to the main server system 140 and proxy server system 110 over a network 120 (e.g., the cloud). Though the connections between the main server system 140 and the proxy server system 110 are shown as being over the web, it does in no way limit the connection from being a dedicated link, such as by cable, radio relay, wireless connection, or satellite connection. The MSS 140 and the PSS 110 are also linked to external networks 130 that comprise social networks 131 and other networks 132. The details and operation of the system 100 are disclosed in co-pending U.S. patent application Ser. No. 14/263,969, filed on Apr. 28, 2014, entitled "Authenticated Registration of Participants for Web Access at Live-Events enabling Data Collection for Improved customer service," the entirety of which is hereby incorporated by reference.

In one embodiment of the invention, an MDA 101 connects to one of the one or more access points 101 at the venue before or during the live event. The MDA sends a request to access the web (i.e., by entering the URL corresponding to the social network 130 or another website 150) to the access point 102, which sends the request to the PSS 110 via the controller 105. The PSS 110 compares the user identifier associated with the MDA 101 to the user IDs on the attendee whitelist 114. If the user identifier of the requesting MDA 101 does not match the user identifier in the attendee whitelist 113, the MDA 101 must be registered and authenticated on the system 100.

If the user request for the website is a request to access the social network 130, the PSS 100 verifies that the requested social network is on the connection white-list 113 and delivers the request social network website to the MDA 101. The registration and authentication is then done by connecting the MDA101 to the requested, approved social network 130. Once connected to the approved social network, the MDA 101 can sign in and register with the web-authoring service 131 of the selected social network 130. The completion of registration and web-authoring of the MDA 101 with the social network is monitored by the PSS 110 and the completion of the sign-in with the social network enables the proxy server 111 to locally register and authenticate the MDAs 101 and add the MDA 101 to the attendee-white-list 114, thereby identifying the attendee within the live-event arena. The authentication also allows the proxy server 111 to collect and save the preferences and social profile, of the registered and authenticated MDAs 101-1 to 101-*m*, available for down load on the social network, on the temporary database 112, on the proxy server system 110, linked to the mobile device IDs in the temporary attendee-database 114. Once an attendee's ID from within the venue is entered on the attendee-white-list in the attendee database 114, the registered and authenticated MDA 101-1 to 101-*m* is able to connect, with full connection capability, as dictated by the permissions available to the attendee, to any approved web site 150 over the web, including the social networks 130 for commenting, blogging and contacting friends and other activities including ordering services within and outside the venue. In one embodiment a summary (log) of these activities, while in the venue is also retained in the attendee database 114 until the end of the live-event or some other selected time. In an alternate embodiment the MDA 101-1 to 101-*m* that are registered and authenticated are able to connect to the main server system (MSS) 140 through the PSS 110 via the link, which is typically the web 120, between the PSS 110 and the MSS 140, to download a script, which typically is a java script (short Java program) that will run on the MDAs, that enable the transfer of the activity data in real-time to the MSS 140. In all embodiments the information in the attendee database 114 and the activity data are transferred to the MSS 140 to update the historic database. In some embodiments, the transfer occurs over the web 120. The historic database 142 includes the historic information 143, which includes at least a date of event, an event ID, and ID for the attendee with associated social profile, preferences, and activities within the venues for all registered and authenticated MDAs 101-1 to 101-*m* in the live-events.

If an unregistered and unauthenticated MDA 101 attempts to connect to a web site other than those in the white-listed social networks 130 on the temporary connection-white-list 113, the proxy server 111 provides a temporary redirect of the request to the main server system (MSS) 140. The proxy server 111 essentially blocks access to the web 150, other than for limited access to the social networks 130 which are on the connection white-list 113, for MDA 101 that are not registered and authenticated with the proxy server 111. The redirect allows the MSS 140 to download the java script onto the un-registered MDA 101. The script down loaded, in addition to enabling continued direct connection of the MDA 101 to the MSS 140, enables a preferred social web authoring site 131 to connect to and open a registration page on the unregistered MDA 101, enabling the MDA 101 to initiate registration on the preferred social network web authoring site 131 through the proxy server 111. This enables the un-authenticated MDA 101, to sign-up or sign-in to the white-listed social network and hence get authenticated on the proxy server 111, as described before.

The authentication includes addition of the specific MDA 101 to the temporary attendee white-list within the temporary attendee-database 114 on the PSS 110. Upon authentication of the MDA 101, the proxy server 111 is able to collect and save the preferences and social profile of the specific registered and authenticated MDA 101 in the temporary attendee-database 114. Once the MDA 101 has been registered, authenticated, and white-listed in the temporary attendee-database 114, the MDA 101 is enabled to connect to all approved web sites 150 (both social 130 and others) for active involvement in the venue and outside from the venue of the live event. The authentication and white-listing process also allow the proxy server system 110 to save the collected data on the MDA 101 in a historic database 142 of attendees on a main server system 140 over the web at the end of each event.

In another embodiment of the invention, the MDAs 101 entering the venue connect to one of the one or more access points 101 at the venue before or during the live event. The MDA sends a request to access the web (i.e., by entering the URL corresponding to the website 150 to the access point 102, which sends the request to the PSS 110 via the controller 105. The PSS 110 compares the user identifier associated with the MDA 101 to the user IDs on the attendee whitelist 114 to check if the MDAs 101 requesting access is already authenticated. If the user identifier of the requesting MDA 101 does not match the user identifier in the attendee whitelist 113, the MDA 101 must be registered and authenticated on the system 100. The PSS 110 redirects the request to a cloud hosted javascript application, typically on the main server (MSS) 140 or in an application store from where the Java script is downloaded and installed on the MDAs 101 web browser. This forms a client-side Javescript. The MDAs 101 use the Javascript application to connect to and sign into a social media authentication service which is white listed on the PSS 110. On successful authentication of the MDA 101, the MDAs 101 accepts and stores an authentication access token and user profile data from the social network in its database. The MDAs 101 also synch with the MSS 140 to store the access token and user profile in the database 142 of the MSS 140. The client side Java script makes an API call to the proxy server to enable the inclusion of the authenticated MDAs 101 in the attendee white list on the PSS 110 and allow access to the world wide web for the authenticated MDAs 101. The client side application program loads content from the MSS 140 to allow the attendees to use the services and features enabled by the application program while at the venue. The synching between the authenticated MDAs 101 and the MSS 140 enable the MDAs 101 to transfer all application and activity data at the venue to the MSS 140 in real time to update the historic database 142 on the MSS 140.

The downloaded java script enables the insertion of a venue specific hash-tag into any external (web) connected activity that takes place from within the live-event venue. The inserted hash-tag has the feature of automatically propagating to related messages. This feature enable hash-tag based search of all related activity on the web and correlating these response activity to the activity within the live-event venue by the registered authenticated attendee hand-held devices 101-1 to 101-*m*. The information so collected can then be consolidated and stored on the MSS 140 with the activity information from within the live-event venue, ready to be analyzed for social impact or influence, social value and economic value of each individual attending the live-event.

In some embodiments, the transfer occurs over the web 120. The historic database 142 includes the historic information 143, which includes at least a date of event, an event ID, and ID for the attendee with associated social profile, preferences, and activities within the venues for all registered and authenticated MDAs 101-1 to 101-*m* in the live-events.

The data is compiled, analyzed and mined to establish attendee status details and preferences and is also stored within the historic database 142. During authentication and white-listing of MDAs 101-1 to 101-*m* during an event, the attendee status and preferences of the authenticated attendees are collected from the historic database to identify any high-value individuals (high spenders, regular attendees and bloggers with high following) in attendance to provide them further incentives to improve their activities and access while in the venue. The available status information also allows focused ads to be provided and enable focused marketing to be initiated for the attendees while in the venue (and outside the venue) based on their status and preferences. The status details also enable personalized ticket sales for new events and season ticket sales to the attendees and specifically to high-value individuals.

Figure 2:
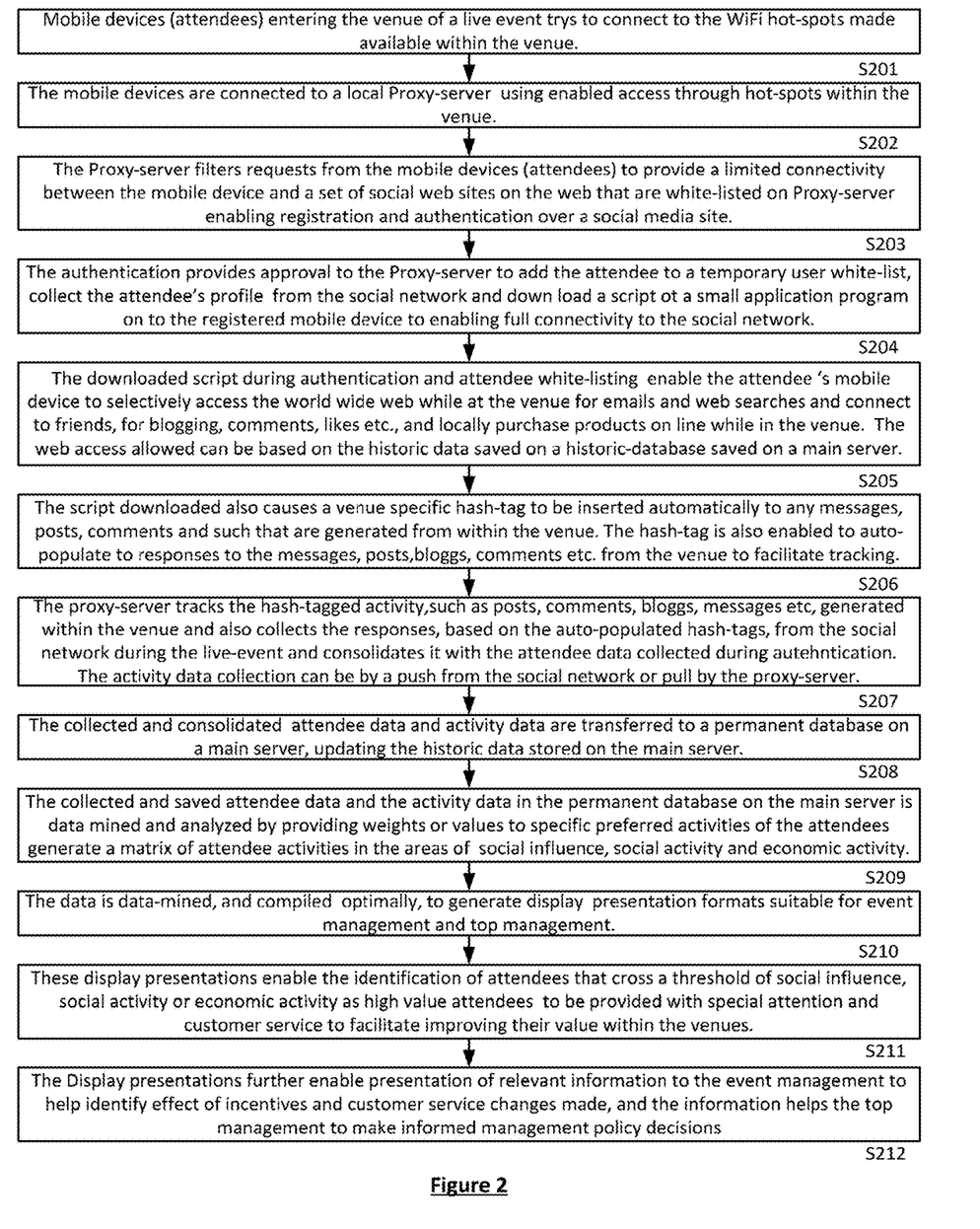
FIG. 2 is a flow chart for authentication of collection of data by insertion of a site-specific self-propagating hash-tag in outgoing activity screens from the venue to enable tracking and collection of related information according to an embodiment of the invention.

FIG. 2 is an exemplary flowchart of a method for collecting and compiling data on the attendees of live-events. The social and economic activity as well as responses of the social connections within the venue may be collected, providing a comprehensive collection of the social and economic impact of the attendees of the live event. The collected data is used to update the historic database which is then used to do data mining for information required to determine the value of individuals attending the live-events. Although the flowchart illustrates the process as a sequential process of operations, it will be appreciated that many of the operations can be performed in parallel or concurrently. In addition, the order of the operations may differ from that shown in FIG. 2.

When an attendee with a mobile device enters the venue of a live event, the multiple hotspots within the venue of the live event are enabled as discoverable and linkable by the mobile device of the attendee (MDA). The MDA connects to the local connectivity within the venue using one of the available hot-spots. S201.

The MDAs are connected to a local proxy server and are uniquely identified by the local proxy server. In one embodiment, the MDAs are connected using an ID. The ID can be based on any mobile device identifiers, such as, for example, the MAC address, IP address, other higher level identification capabilities, etc. The MDAs connectivity within the venue is established through a controller linked to and under control of the proxy server which acts as a gateway enabling access through hot-spots within the venue. S202.

The proxy server controls and filters the requests from the MDAs initially to provide a limited connectivity between the MDAs and a set of approved social web sites on the web. The social sites to which the attendees can connect for enabling registration are managed through a pre-established connection white-list on the proxy server. S203.

The limited connections to the social network enabled by the proxy server allow the MDAs to sign into the social networks. Once the MDAs sign into the social network, full connectivity to that social network for connection to friends, for blogging, comments, likes etc. is enabled. Registration and authentication with the social network also allows the connected MDA to get focused advertisements delivered to them and enables the MDA to locally purchase products online in the live-event venue. In one embodiment, the registration and authentication downloads the java-script or small location specific application program (i.e., app) onto the registered mobile device, which enables full connectivity of the MDAs to the social network through the PSS. The sign-in by the MDAs provides approval to the proxy server. The proxy server then adds the MDAs' IDs to a temporary attendee white-list to authenticate the MDAs. The proxy server is then enabled to and allowed to collect the attendees' social profiles from the social network, add any activity data of the attendee while in the venue, and save all the collected data in a temporary attendee-database on the proxy server. S204.

The javascript downloaded during authentication and attendee white listing enable the attendee's mobile device to selectively access the world wide web while at the venue for emails and web searches and connect to friends for blogging, comments, likes, etc., and locally purchase products on line while in the venue. The web access allowed can be based on the historic data saved in the historic database. S205.

The java script or app downloaded on the mobile devices, 101-1 to 101-*m*, also causes an attendee and venue specific identification component, such as a hash-tag, to be associated automatically with any messages, posts, comments and such that are generated from within the live-event venue. In one embodiment, the associated identification component is also enabled to auto-populate into responses to the messages, posts, blogs, comments, etc. from the live-event venue to facilitate tracking of the social activity within the venue and responses generated outside in the web to the activity within the live-event venue. S206.

At the end of the live-event or at some other selected time, the PSS transfers the collected attendee data, including the posts, comments, blogs, messages, etc. generated within the venue and also collects the responses based on the auto-populated identification component from the social networks and other web sites, and consolidates it with the attendee data corresponding to the registered and authenticated MDAs from the temporary attendee database to the permanent historic database on the MSS, updating the historic data stored in the historic-database on the MSS for all attendees to the live event. S207.

The collected and consolidated attendee data and activity data are moved to the permanent database on the MSS, updating the historic data stored therein. The data from the live-event venue is stored separate from the response data within the database, and all data is stored with a link to the attendees mobile device 101-1 to 101-*m*. S208.

The collected and saved attendee data and the activity data in the permanent database 142 on the MSS 140 is data mined and analyzed by providing weights or values to specific preferred activities of the attendees and generate a table of attendees and their activities in the areas of social influence, social activity and economic activity. S209.

The data is data-mined and compiled optimally to generate display presentation formats suitable for event management and top management. S210.

These display presentations enable the identification of attendees that cross a threshold of social influence, social activity or economic activity as high-value attendees to be provided with special attention and customer service to facilitate improving their value within the venue. S211.

The display presentation further enables presentation of relevant information to the event management to help identify the effect of incentives and customer service changes that have been made and further to help top management to make informed management policy decisions. S212.

Figure 4:
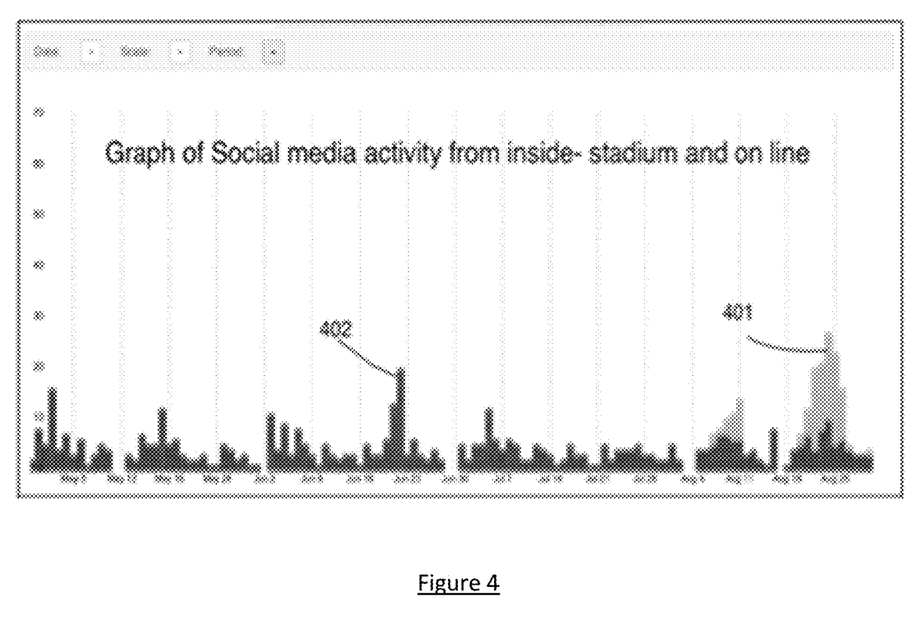
FIG. 4 is an exemplary display of the social media activities providing social impact from the live-event venue and outside on the net according to an embodiment of the invention.
Figure 9:
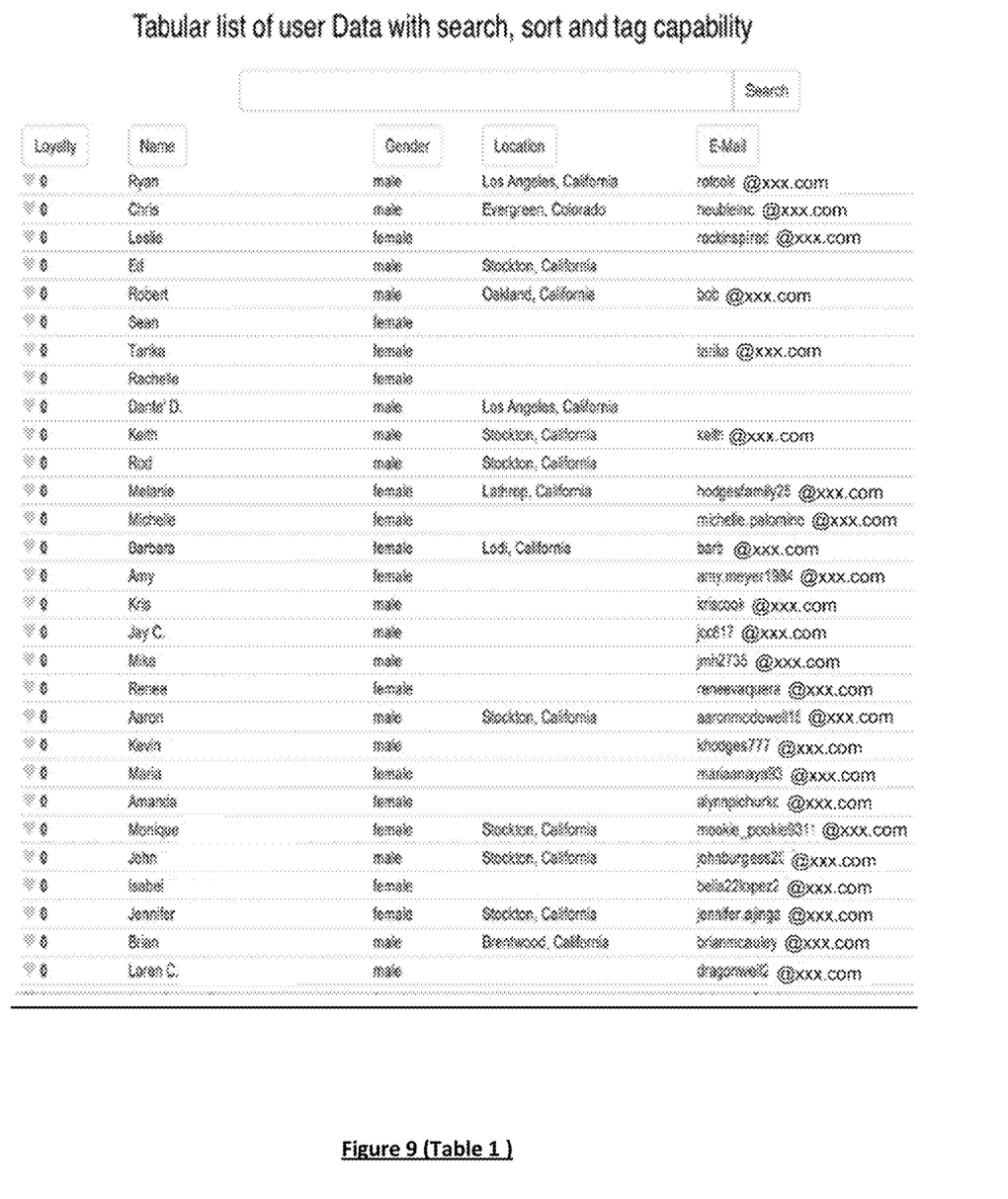
FIG. 9 is an exemplary tabular list of a database of some of the collected user-related data from a live-event venue, which can be searched, sorted and tagged to be analyzed using the computing capability of the system, according to an embodiment of the invention.

FIG. 9 illustrates a table, referred to as Table 1 herein, which is a tabular list of some of the collected user related data from a live-event venue, which can be searched, sorted and tagged to be analyzed. Since this table is linked to the compiled data in the database it can be used to generate displays of the social influence, social value and economic value for the individuals being analyzed. An exemplary display of such social activity 402 from the venue by individuals and its response on the web 401 is shown in FIG. 4.

Figure 5:
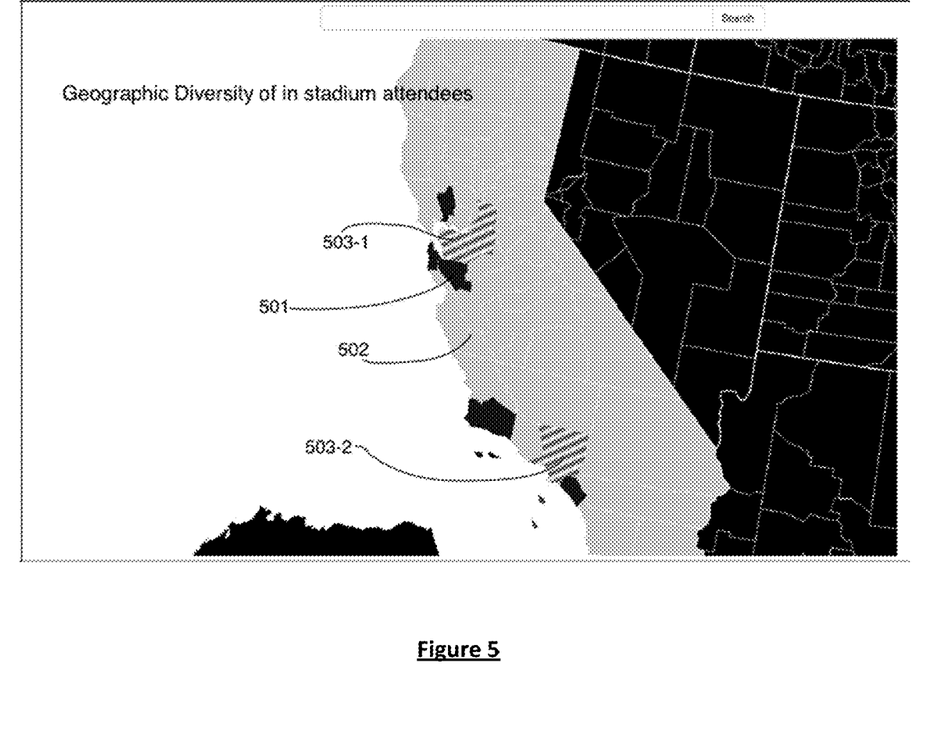
FIG. 5 is an exemplary display of the geographic location density and diversity of in stadium attendees according to an embodiment of the invention.

The collected and compiled data also provides geographic information of where the attendees are from and the concentrations within these geographic regions. Such a grouping is very useful to the management in making decisions on where to spend the scared funds for maximizing the impact of advertising. A display of such a grouping is shown in FIG. 5. The locations 503-1 and 503-2 representing the maximum concentrations of attendees while 502 show a lower representation at the venues. The display also shows the failure of effective advertising in the neighborhood of the venue by indicating no attendance at the venue from the locations 501. This provides an understanding to the management that there has been a gap in providing ads and incentives to these areas near the venues to attract the residents to the live-event at the venue enabling them to provide focused advertisement in these locations.

Figure 6:
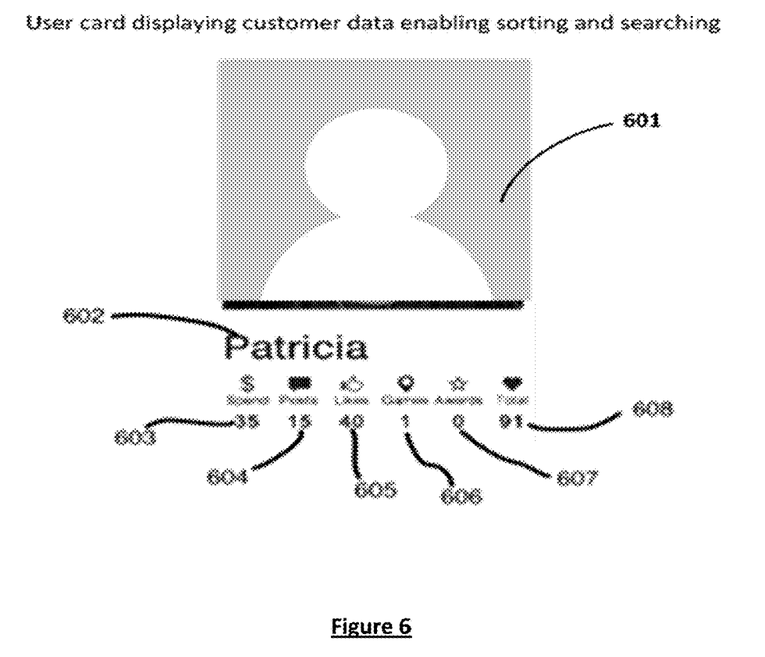
FIG. 6 is an exemplary display of the customer card indicating a sample of the data collected on each of the attendees according to an embodiment of the invention.

FIG. 6 is an example of a user information card displaying a set of user data collected and compiled. 601 is a display of a picture or an avatar of the user with 602 providing the name. The economic activity of the user in the venue is presented at 603. The social activity such as posts blogs/texts are provided at 604 and 605 respectively. The attendance at previous games is shown at 606. The loyalty incentives that have been achieved by the person is shown at 607 and the overall weightage of the individual due to the social and economic activities at the venue is indicated at 608. This example shows only a limited set of activities. Other information may be included in the information card, such, as for example, responses to the texts and posts, etc. leading to social influence, etc.

Figure 7:
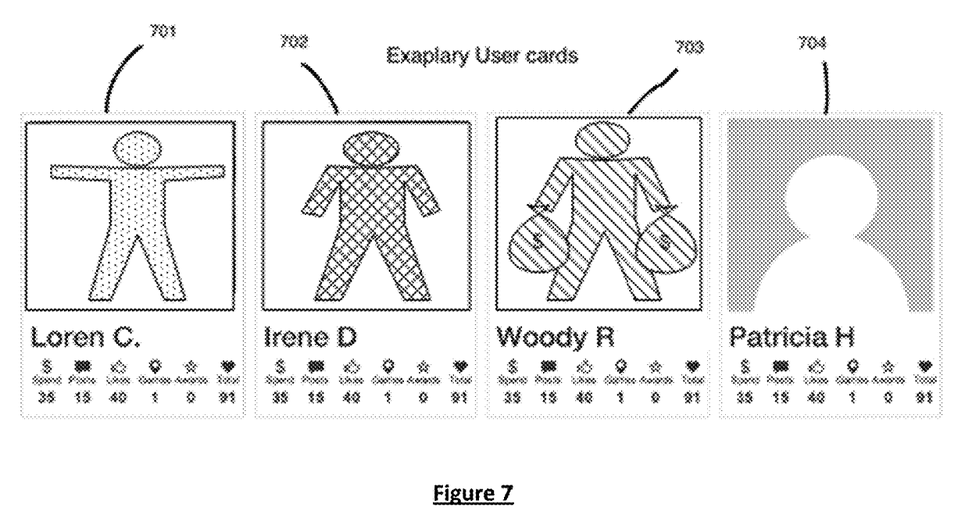
FIG. 7 is an exemplary of a small set of customer cards of attendees of FIG. 6 that allow search sort and tag capabilities based on characteristics of the collected data according to an embodiment of the invention.

FIG. 7 is a set of such user information cards 701 to 704 which can be used to display the information in a very understandable and concise form. These cards and the information content can be searched, sorted and tagged based on any of the relevant fields within the card such as 602 to 608.

Figure 8:
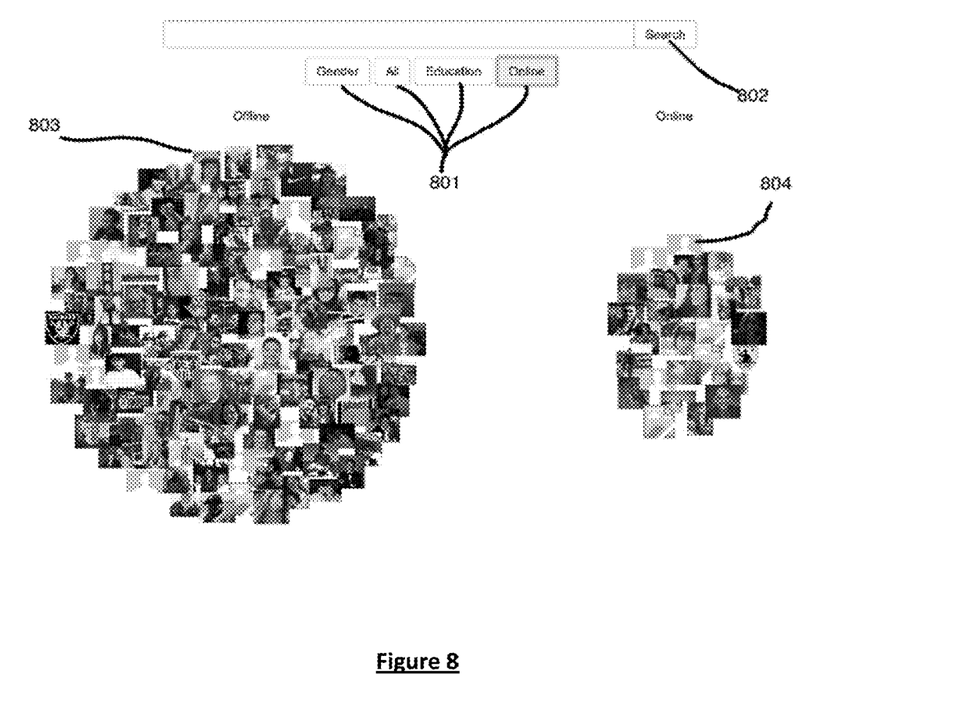
FIG. 8 is an exemplary bubble chart display of the users grouped by profile properties, enabling large amounts of customer data to be sorted into buckets, which enable interactive introspection into the sorted buckets according to an embodiment of the invention.

FIG. 8 shows the result of such a search and sort of all individuals having a specific characteristic in the venue based on the individuals who are within the live-event venue and currently on line. A search field display 801 indicates some of the characteristics for a search such as educational back ground, gender and whether the user is on-line or off-line. Additional constraints can be input at the search field 802 to improve the search output. In the specific example, illustrated in FIG. 8, for the selected criteria (e.g., "online"), the output shows the individuals matching the criteria who are off-line 803 and those who are on-line 804 at that search time. It will appreciated that alternative search results will be displayed for other searches. Furthermore, it will be appreciated, that any number of alternative search features may be displayed as will be understood to persons of skill in the art. For example, the economic status, number of connections, or other search features may be used. It will be further appreciated that the compiled data can be displayed in a multitude of ways to facilitate easy assimilation and present the needed information.

Figure 3:
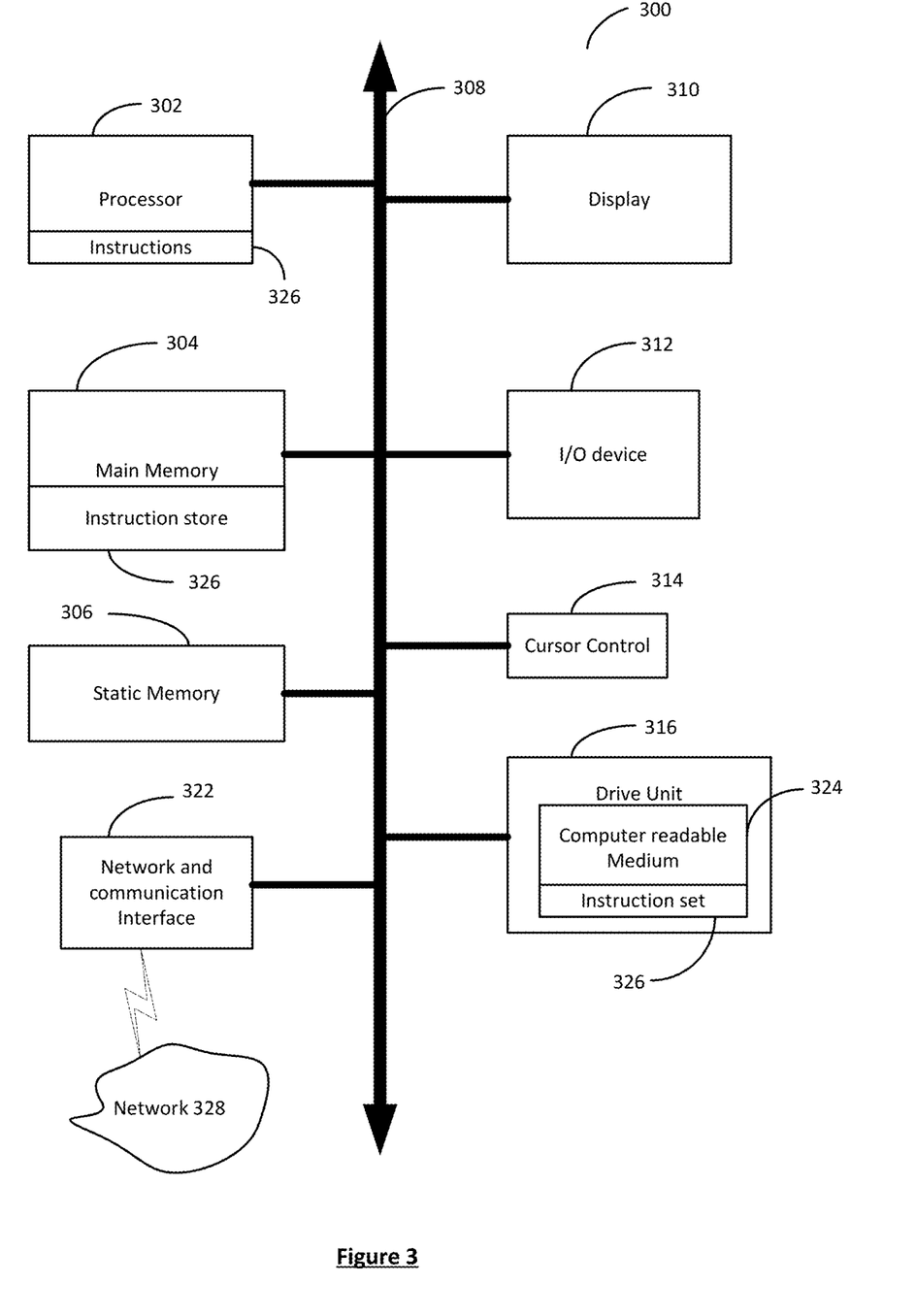
FIG. 3 is a schematic diagram showing a diagrammatic representation of a machine in the exemplary form of a computer system according to an embodiment of the invention.

FIG. 3 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an access point, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 (e.g., read only memory (ROM), flash memory, dynamic random access memory (DRAM) such as synchronous DRAM (SDRAM) or Rambus DRAM (RDRAM), etc.) and a static memory 306 (e.g., flash memory, static random access memory (SRAM), etc.), which communicate with each other via a bus 308.

The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 320 (e.g., a speaker) and a network interface device 322.

The disk drive unit 316 includes a computer-readable medium 324 on which is stored one or more sets of instructions (e.g., software 326) embodying any one or more of the methodologies or functions described herein. The software 326 may also reside, completely or at least partially, within the main memory 304 and/or within the processor 302 during execution thereof by the computer system 300, the main memory 304 and the processor 302 also constituting computer-readable media.

The software 326 may further be transmitted or received over a network 328 via the network interface device 322.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

It should be understood that components described herein include computer hardware and/or executable software code which is stored on a computer-readable medium for execution on appropriate computing hardware.

The terms "computer-readable medium" or "machine readable medium" should be taken to include a single medium or multiple media that store the one or more sets of instructions. The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. The terms "computer-readable medium" or "machine readable medium" shall accordingly be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A communication system distributed throughout a venue, the communication system comprising:
    a plurality of wireless access points distributed in a venue, communicatively coupled to at least one mobile device during a live event, wherein a social media application for the live event is operating on the at least one mobile device and is receiving user input from a user located at the at least one mobile device, wherein the user input comprises user profile information and user activities during the live event;
    an access controller connected to the plurality of wireless access points;
    a proxy server communicatively coupled to the access controller and a network, wherein the proxy server is configured to receive a network access request and the user input from the at least one mobile device received during the live event via the access controller, and wherein the proxy server is configured to authenticate the at least one mobile device based on the received network access request and the received user input; and
    a main server communicatively coupled to the network, and to the proxy server via the network, wherein the main server is configured to generate consolidated information and individual-specific information based on the received network access request and the received user input to determine a high-value individual, wherein the main server is configured to send an alert to the at least one mobile device of the high-value individual notifying of incentives to exert influence during the live event;
    at least one display device communicatively coupled to the main server configured to display the high-value individual based on the generated consolidated information and individual-specific information.

2. The communication system of claim 1, further comprising a temporary database configured to store the user data, wherein the temporary database is either stored in a memory on the proxy server or in a memory communicatively connected to the proxy server.

3. The system of claim 2, wherein the temporary database comprises user information corresponding to individuals associated with each of the mobile devices authenticated at the proxy server.

4. The communication system of claim 2, further comprising a historic database stored in memory of the main server or stored in a memory communicatively coupled with the main server.

5. The communication system of claim 4, wherein the historic database is configured to store the user input during the live event.

6. The communication system of claim 1, wherein the main server is configured to identify attendees that exceed a pre-defined threshold of social influence, social activity or economic activities.

7. The communication system of claim 1, wherein the main server directs the at least one display to display information to event management to identify an effect of incentives and customer services changes made during the live event.

8. A computer-implemented method using a communication system wirelessly distributed throughout a venue, the computer-implemented method comprising:
    connecting at least one mobile devices to a proxy server during a live event, wherein a social media application for the live event is operating on the at least one mobile device;
    receiving user input from a user located at the at least one mobile device, wherein the user input comprises user profile information and user activities during the live event, wherein the user qualifies as a high-value individual;
    associating the at least one mobile devices with a hash tag at the proxy server;

receiving a request to access the social media platform at the proxy server from the at least one mobile device; and updating the user activities in the user data with the hash tag, wherein the hash tag is auto-populated in response to the user activities, and wherein the auto-populated hash tag enables tracking an impact of the user activities during the live event.

9. The computer-implemented method of claim 8, further comprising receiving user profile information from the social media application user activities from the venue, and responses to the user activities using the hash tag;

storing the received user profile information, user activities, and responses with a list of authenticated users in a temporary database, wherein the temporary database is either stored in a memory on the proxy server or in a memory communicatively connected to the proxy server; and transferring the received user profile information, user activities, and responses to a historic database with an event identifier, wherein the historic database is either stored in memory of a main server communicatively coupled to the proxy server, or stored in a memory communicatively coupled with the main server.

10. The computer-implemented method of claim 9, wherein the user activities comprises to social network activity received at the social media application.

11. The method of claim 9, wherein the user activities comprises internet activity received at the at least one mobile device.

12. A computer-implemented method using a communication system wirelessly distributed throughout a venue, the computer-implemented method comprising:

connecting at least one mobile devices to a proxy server during a live event, wherein a social media application for the live event is operating on the at least one mobile device;

generating a venue and attendee-specific identifier at the proxy server;

associating the generated venue and attendee-specific identifier with the at least one mobile devices connected to the proxy server;

receiving user input from a user located at the at least one mobile device, wherein the user qualifies as a high-value individual, and wherein the user input comprises social and economic activity of the user during the live event while using the attendee-specific identifier at the proxy server;

identifying the at least one mobile device operated by the high-value individual, wherein the high-value individual is predetermined to be capable of influencing consumer activity among other users within the venue and outside of the venue based on the received user input; and sending an alert to the at least one mobile device of the high-value individual notifying of incentives to exert influence during the live event.

13. The computer-implemented method of claim 12, further comprising:

receiving user profile information from the social media application and user activities at the live event;

storing the received user profile information, user activities, and responses with a list of authenticated users in a temporary database, wherein the temporary database is either stored in a memory on the proxy server or in a memory communicatively connected to the proxy server; and transferring the received user profile information, user activities to a historic database with an event identifier, wherein the historic database is either stored in memory of a main server communicatively coupled to the proxy server, or stored in a memory communicatively coupled with the main server.

14. The computer-implemented method of claim 12, further comprising receiving personal preferences and social profile details of the user in real-time.

15. The computer-implemented method of claim 12, wherein the venue and attendee-specific identifier is self-propagating to communication and social responses within the social media application.

16. The computer-implemented method of claim 15, wherein the venue and attendee-specific identifier enables tracking of response activity within the social media application to social activity by the user during the live event.

17. The computer-implemented method of claim 16, wherein the venue and attendee-specific identifier comprises a hash tag.

18. The computer-implemented method of claim 16, wherein the response activity is selected from the group consisting of posts, comments, blogs and messages.

19. The computer-implemented method of claim 16, wherein the social activity is selected from the group consisting of posts, comments, blogs and messages.

20. The computer-implemented method of claim 16, wherein associating the generated venue and attendee-specific identifier with the at least one mobile device comprises sending a script to the at least one mobile device that contains the hash tag.

* * * * *